3,004,982
NEW BENZIMIDAZOLES

Karl Hoffmann, Binningen, and Alfred Hunger, Jindrich Kebrle, and Alberto Rossi, Basel, Switzerland, assignors to Ciba Pharmaceutical Products Inc., Summit, N.J.
No Drawing. Filed Nov. 9, 1959, Ser. No. 851,538
Claims priority, application Switzerland Nov. 27, 1958
5 Claims. (Cl. 260—309.2)

This invention provides 1-($\beta$-diethylaminoethyl)-2-(aryl-aminoalkyl)-benzimidazoles the alkyl group of which contains 1–5 carbon atoms especially methyl, ethyl, propyl, and the aryl radical at most 2 benzene rings, and their acid addition salts.

The invention is especially concerned with benzimidazoles of the formula

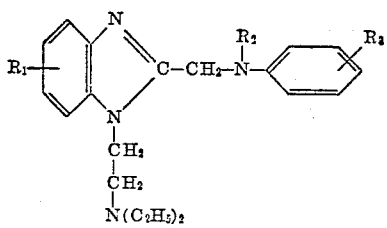

in which $R_1$ and $R_3$ indicate hydrogen, hydroxyl, alkyl or alkoxy containing 1–5 carbon atoms, especially methyl, ethyl, propyl, methoxy, ethoxy, propoxy, the amino or nitro group or halogen and $R_2$ is hydrogen, a hydrocarbon radical, such as lower alkyl, for instance methyl, ethyl, propyl, or aralkyl such as benzyl or aryl such as phenyl, or a lower alkanoyl, such as a formyl, acetyl, propionyl radical, and their acid addition salts.

The new compounds have a local anaesthetic and a very good analgesic activity and can accordingly be particularly used as analgesics. Of special interest on account of their analgesic properties are the compounds of the formula

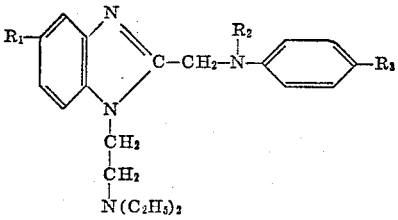

in which $R_1$ stands for halogen, alkyl having 1–3 carbon atoms or the nitro group and $R_3$ for halogen, alkoxy or alkyl, having 1–3 carbon atoms, and either $R_1$ or $R_3$ may also be hydrogen and $R_2$ indicates hydrogen, alkyl or alkanoyl having 1–3 carbon atoms primarily 1-($\beta$-diethylamino - ethyl) - 2 - (p-ethoxy-phenyl-aminoethyl)-benzimidazole and 1-($\beta$-diethyl-amino-ethyl)-2-(phenyl-amino-methyl)-5-nitro-benzimidazole and their acid addition salts.

The new benzimidazoles are obtained by methods known per se. One method of production consists, for example, in that the benzimidazole ring is formed by ring closure starting from 2-(R''—NH)-anilines or their corresponding N-substituted derivatives, in which case R'' indicates the diethylaminoethyl group or a radical convertible thereinto, for example a halogen alkyl group. The radical convertible into the diethylaminoethyl group is then subsequently converted into this group, in the case of the halogen alkyl group for example by reaction with diethylamine. Thus, for example a 2-(diethylamino-ethyl-amino)-aniline can be subjected to ring closure, directly or in stages, with aryl-amino-alkane carboxylic acids or their reactive functional derivatives, especially imino ethers.

In the reaction products a secondary arylamino-alkyl group can be alkylated, for example methylated, by means of formaldehyde and formic acid, or it can be acylated by reaction with acid derivatives, for example halides or anhydrides. Substituents can also be introduced into the aryl radicals or replaced by other groups; thus a nitro group can be introduced by nitration or a hydroxyl group can be converted into an etherified or esterified hydroxyl group, such as a low alkoxy group, or a nitro group converted into an amino group and this into a low alkoxy group or into halogen atoms.

The above described reactions are carried out in the presence or absence of diluents and/or condensing agents, if necessary at elevated temperature, and in open vessels or in closed vessels under pressure.

According to the method of working the new compounds are obtained in the form of the free bases or their salts. From the salts the free bases can be produced in the manner known per se. From the latter, salts can be produced by reaction with acids suitable for the formation of therapeutically applicable salts, for example the salts of the hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, hydroxy ethane sulfonic acid, benzene or toluene sulfonic acid or of therapeutically active acids.

The starting materials are known or can be prepared by methods known per se.

The invention also comprises any modification of the process in which a compound obtainable as an intermediate at any stage of the complete process is used as starting material and the remaining step or steps are carried out.

The new compounds can be used as medicaments, for example in the form of pharmaceutical preparations containing them or their salts in admixture with a pharmaceutical, organic or inorganic, solid or liquid carrier material suitable for enteral, parenteral or local administration. For the production thereof such substances are concerned as do not react with the new compound, for example water, gelatine, lactose, starch, magnesium stearate, talc, vegetable oils, benzyl alcohols, gums, polyalkylene glycols, petroleum jelly, cholesterol or other known medicament carriers. The pharmaceutical preparations can be made up, for example, as tablets, dragees, salves, creams or in liquid form as solutions, suspensions or emulsions. If desired, they are sterilized and/or containing auxiliary substances such as preserving, stabilizing, wetting or emulsifying agents, salts for variation of the osmotic pressure or buffer substances. They can also contain other therapeutically valuable substances.

The following examples illustrate the invention:

Example 1

13.2 grams of anilino-acetonitrile, 4.2 ml. of absolute methyl alcohol and 200 ml. of absolute chloroform are saturated at −10° C. with dry hydrochloric acid gas, allowed to stand for 14 hours at 25° C. and then treated with 18.7 grams of 2-($\beta$-diethylamino-ethyl-amino)-aniline and the whole boiled for 16 hours under reflux with stirring. The reaction mixture is evaporated to dryness under vacuum, taken up in aqueous hydrochloric acid, the acid aqueous solution, after extraction with ether, rendered alkaline with ammonia solution, extracted with chloroform and the extract washed with sodium carbonate solution, dried with magnesium sulfate and evaporated. The resulting crude 1-($\beta$-diethylaminoethyl)-2-(phenylamino-methyl)-benzimidazole of the formula

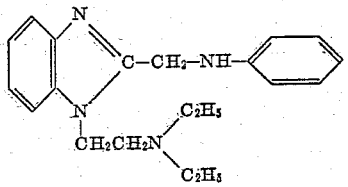

is converted into the dihydrochloride of M.P. 190–191° C. by dissolving in alcohol and adding two equivalents of alcoholic hydrochloric acid.

Example 2

35. grams of p-ethoxy-anilino-acetonitrile, 8.4 ml. of absolute methyl alcohol and 400 ml. of chloroform are saturated at −10° C. with dry hydrochloric acid gas, allowed to stand for 14 hours at 25° C. and then treated with 30 grams of 2-(β-diethylamino-ethylamino)-aniline and boiled under reflux for 70 hours with stirring. The reaction mixture is evaporated under vauum, taken up in aqueous hydrochloric acid and the acid solution, after extraction with ether, rendered alkaline with ammonia solution, extracted with chloroform and the extract washed with sodium carbonate solution, dried with magnesium sulfate and evaporated. The residue is taken up in ether, freed from insoluble material by filtration, the ether evaporated and the residue distilled in a bulb tube. The partly crystalline 1-(β-diethylamino-ethyl)-2-(p-ethoxy-phenyl-aminomethyl)-benzimidazole, distilling at 180°–200° C. under 0.05 mm. pressure, of the formula

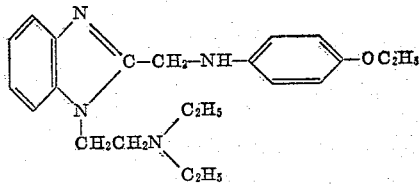

is converted into the mono-hydrochloride melting at 166–167° C. by dissolving in alcohol and adding one equivalent of alcoholic hydrochloric acid.

Example 3

Into a mixture of 20 grams of phenylamino-acetonitrile, 6.2 ml. of methanol and 400 ml. of chloroform, dry hydrochloric acid gas is passed with stirring at 0° C. to the point of saturation, after which stirring is continued for 16 hours at room temperature. The separated material is filtered with suction, rapidly washed with absolute ether, dried under vacuum and introduced at 40° C. into a solution of 14.4 grams of 2-β-diethyl-amino-ethylamino-5-nitraniline hydrochloride in 150 ml. of glacial acetic acid. The reaction mixture is then stirred for 48 hours at 40° C., filtered, the filtrate evaporated under vacuum and shaken for two hours with a mixture of 100 ml. of ether, 100 ml. of water and 10 ml. of concentrated sodium hydroxide solution. The ether extract is extracted with dilute hydrochloric acid, the base liberated from the aqueous layer by means of alkali, taken up in ether, dried and freed from solvent. The residue is crystallized from alcohol. In this manner 1 - β - diethylamino - ethyl - 2 - phenylaminomethyl - 5-nitro-benzimidazole is obtained of the formula

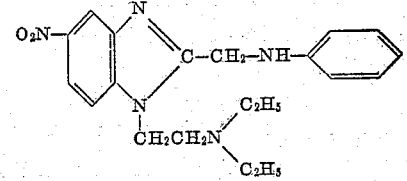

as a light yellow substance melting at 110° C., which can be converted with the calculated quantity of hydrochloric acid into the hydrochloride of melting point 196° C.

What is claimed is:

1. A member selected from the group consisting of benzimidazoles of the formula

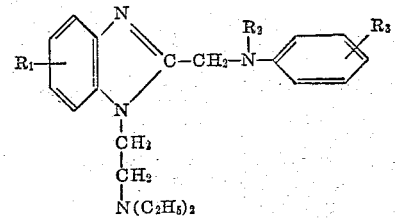

in which $R_1$ and $R_3$ stand for a member selected from the group consisting of hydrogen, alkyl and alkoxy containing 1–5 carbon atoms, nitro and halogen, and $R_2$ a member selected from the group consisting of hydrogen, lower alkyl, phenyl, benzyl and lower alkanoyl, and their therapeutically useful acid addition salts.

2. 1 - (β - diethylamino - ethyl) - 2 - (para - ethoxy-phenyl-amino-methyl)-benzimidazole.

3. 1 - (β - diethylamino - ethyl) - 2 - (phenylamino-methyl)-5-nitro-benzimidazole.

4. A therapeutically useful acid addition salt of a compound of claim 2.

5. A therapeutically useful acid addition salt of a compound of claim 3.

No references cited.